United States Patent [19]
Houghton

[11] 3,724,989
[45] Apr. 3, 1973

[54] APPARATUS FOR FORMING ARTICLES COMPRISING A PAIR OF ADJACENT WALLED STRUCTURES UNIDIRECTIONALLY PRESENTED OPENINGS

[75] Inventor: Norman F. Houghton, Connersville, Ind.

[73] Assignee: Philco-Ford Corporation, Philadelphia, Pa.

[22] Filed: Dec. 16, 1971

[21] Appl. No.: 208,962

Related U.S. Application Data

[62] Division of Ser. No. 73,761, Sept. 21, 1970.

[52] U.S. Cl..............425/388, 264/92, 425/DIG. 60
[51] Int. Cl............................................B29c 17/04
[58] Field of Search..........264/89, 90, 92, 93, 96, 98, 264/292; 425/388, 405, DIG. 3, DIG. 14, DIG. 60

[56] References Cited

UNITED STATES PATENTS

| | | | |
|---|---|---|---|
| 3,574,807 | 4/1971 | Heavener | 425/388 X |
| 3,577,593 | 5/1971 | Jackson | 425/DIG. 58 |
| 3,597,799 | 8/1971 | Earle | 425/388 X |
| 3,368,243 | 2/1968 | Kohen | 425/388 |
| 3,145,243 | 8/1964 | Hagen | 425/326 B X |
| 3,520,962 | 7/1970 | Schneider | 425/388 X |

Primary Examiner—Robert L. Spicer, Jr.
Attorney—Carl H. Synnestvedt

[57] ABSTRACT

In a vacuum-forming operation, a pair of adjacent, side-by-side compartment liners are formed from a single sheet of thermoplastic material. A pair of adjacent molds, each having the desired shape of the inside surface of the corresponding liner to be formed, are mounted along their base portions on frame structure hinged in the region of adjacency of the mold base portions, to provide for pivotation of the base portions so that confronting surfaces of the molds are movable angularly toward and away from one another. A sheet of thermoplastic material is disposed to extend over the molds, and is heated, causing it to soften while the molds are held in pivoted position in which the confronting surfaces are substantially spaced from one another. Mold assist-plugs and the molds are then moved, relative to one another, to urge the sheet into general close conformity with the molds. While the sheet of material is still soft the assist-plugs further are caused to engage the mold frame structure, through the intermediacy of the sheet, pivoting the frame structure and causing adjacent wall portions of the molds to move toward one another and assume their closely spaced position. Air entrapped between the heated sheet and the walls of the molds is then evacuated through a number of small ports or vents in the walls, thereby forming the desired liners which are cooled and stripped from the molds.

6 Claims, 7 Drawing Figures

PATENTED APR 3 1973

3,724,989

3,724,989

APPARATUS FOR FORMING ARTICLES COMPRISING A PAIR OF ADJACENT WALLED STRUCTURES UNIDIRECTIONALLY PRESENTED OPENINGS

This is a division of application Ser. No. 73,761, filed Sept. 21, 1970.

BACKGROUND OF THE INVENTION

This invention relates to the fabrication of articles from sheets of thermoplastic material, and is more particularly concerned with an improved method and apparatus for forming deep-drawn shapes, for example food storage compartment liners for refrigerator cabinets.

In producing an article of the aforementioned type, it is known to bring an assist-plug into contact with a heat-softened sheet of thermoplastic material to urge portions thereof onto a forming mold, after which the material is subjected to a vacuum, while in its heat-softened state, to effect the desired shape. In the fabrication of liners for side-by-side refrigerators it has been desired to mold the liners from a single sheet, but it has been found virtually impossible to control the thickness of the sheet in the region of adjacent walls of the liners, due to the close spacing therebetween.

It is an objective of this invention to provide an improved mold structure and vacuum forming method which overcomes the above mentioned difficulties and is useful in the fabrication of side-by-side cabinet liners, for either vertical or horizontal disposition.

SUMMARY OF THE INVENTION

In achievement of the foregoing as well as other objectives, the invention contemplates a novel method and apparatus for forming side-by-side compartment liners, having unidirectionally presented openings shaped for either vertical or horizontal disposition, from a single sheet of thermoplastic material. The invention is particularly characterized by the provision of a pair of adjacent, substantially unidirectionally presented molds each having the desired shape of one of the liners to be formed, preferably although not necessarily the shape of the inside surface, and each having vented wall sections. The molds are mounted along base portions thereof on frame structure so hinged, in the region of adjacency of said base portions, as to provide for pivotation of the molds between a position in which confronting surfaces thereof are more widely spaced and a position in which the surfaces are more closely spaced. In one aspect of the invention it is an object to provide such pivotable mold structure.

An assist-plug confronts the molds, and the plug and molds are relatively movable toward and away from one another in telescoping relationship. In fabrication of a pair of liners, a sheet of thermoplastic material is placed between the assist-plug and the molds. The sheet of material is then heated causing it to soften while the molds are in their pivoted positions in which the confronting surfaces are more widely spaced. The assist-plug and the molds are then moved relative to one another, to engage the heat-softened sheet and urge it onto the molds. This movement is followed by interengagement of the two structures to urge the molds to non-pivoted, liner-forming position in which the confronting surfaces of the molds are in closely spaced, generally parallel, position. Air entrapped between the heated sheet and the molds is then removed through the large number of vents, or ports, in the walls thereof, thereby forming the desired liners which are subsequently cooled and stripped from the molds.

For a further understanding of the invention, and the manner in which the objectives and advantages thereof may best be achieved, reference is made to the following description, taken in light of the accompanying drawing.

DESCRIPTION OF THE PREFERRED EMBODIMENT

Figure 1:
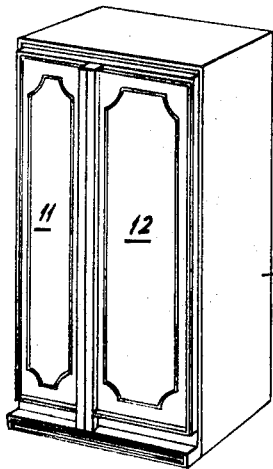
FIG. 1 is a perspective showing, on a reduced scale, of a refrigerator cabinet of a type embodying a compartment liner made in accordance with the invention.
Figure 2:
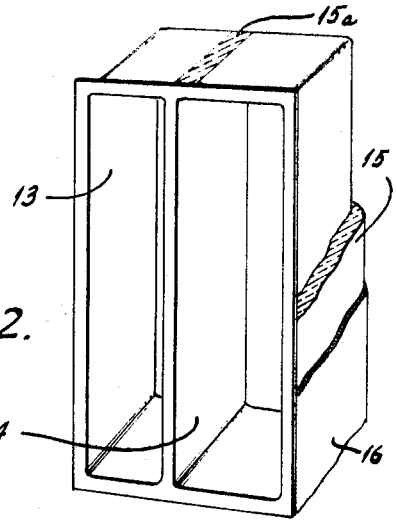
FIG. 2 is a view similar to FIG. 1, but with major portions of the cabinet broken away to show the compartment liner.

With reference to FIG. 1, a refrigerator cabinet 10 has side-by-side compartments provided with unidirectionally presented openings (not shown) each closed by one of a pair of doors 11 and 12. With reference also to FIG. 2, each compartment is defined by one of the liner sections 13 and 14. The liner sections are made of a thermoplastic material, and are molded, as an integral structure, from a single flat sheet of such material. Thermal insulation of the foamed type, for example, and designated generally by the numerals 15, 15a, fills the spaces between the confronting walls of liner sections 13 and 14, and between outer walls of these same sections and walls of the outer shell 16 of cabinet 10. It will be understood, of course, that other well known suitable types of thermal insulation may be used.

The characteristically close spacing between side-by-side liners heretofore has made it difficult to form the confronting side walls of the liners, due particularly to the relatively small amount of thermoplastic material available in the blank sheet for the relatively deep draw required in this region. From what follows, it will be appreciated that the present invention overcomes this problem.

Figure 3:
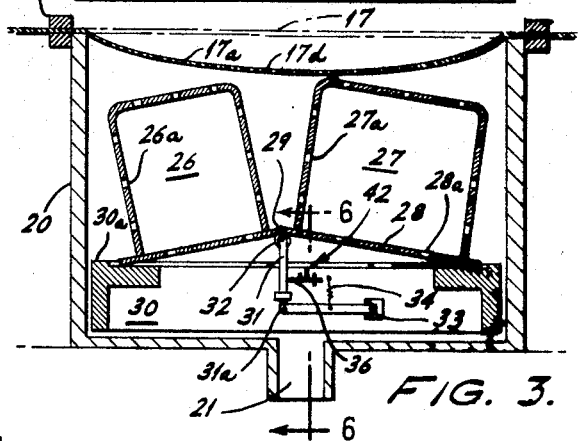
FIG. 3 is a sectional-elevational view of apparatus for fabricating the compartment liner illustrated in FIG. 2.

With reference to FIG. 3, an open top, generally box-shaped chamber 20 is ported at 21 to a suitable vacuum producing mechanism (not shown) of conventional design. A clamping ring 22 closely surrounds the upper rim of chamber 20, and is constructed and arranged to clamp in place a sheet 17 of thermoplastic material that extends over the upper rim of chamber 20. A radiant heater 23 is arranged to overlie sheet 17 to heat the same, and is mounted for lateral movements between the illustrated extended position and a retracted position in which it is removed from above the sheet. As assist-plug 24, of generally rectangular shape, is disposed above the heater and has slightly rounded (see FIG. 7) peripherally extending edge portions 25. In the illustrated embodiment, relative movement between the plug and mold is provided for by mounting both plug 24 and the molds 26, 27 for vertical movements, into and out of telescoping relationship. No apparatus for mounting the plug 24 has been shown since this apparatus can be entirely conventional in nature.

In especial accordance with the invention, a pair of adjacently positioned, substantially unidirectionally presented molds 26 and 27, each having the general box-shape of the inside surfaces of respective liner sections 13 and 14 to be molded, are mounted along their base portions on articulated frame structure 28 hinged at 29 in the region of adjacency of the mold base portions. As is known in the art, the frame structure 28 is ported, as seen at 28a, and the molds are provided with large numbers of vents or ducts, which appear on an enlarged scale at 26a and 27a. Frame structure 28 is supported for both sliding and pivotal movements on a generally rectangular, open support frame 30 having a peripheral rim 30a (FIGS. 3 and 5) that both confines and positions the molds. Preferably, and as shown, support frame 30 is elevatable from the position shown in FIG. 3 to the upper position shown in FIG. 5, in which upper position the level of the frame structure 28 and mold base portions thereon is substantially at the level of the upper edge of chamber 20.

Figure 6:
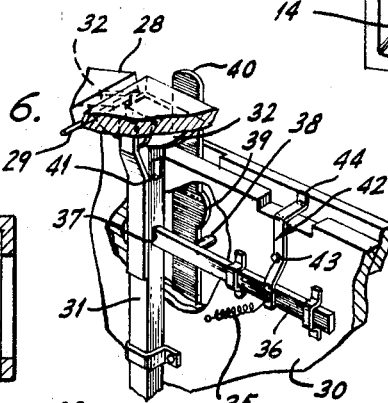
FIG. 6 is a perspective showing of a portion of a latch apparatus illustrated in FIG. 3, with parts broken away and as seen looking generally in the direction of arrows 6—6 in FIG. 3.

Conveniently, and with reference to FIGS. 3 and 6, the upwardly pivoted position of frame structure 28 is maintained by mechanism including a vertically movable link 31 mounted on a side member of lower frame 30, and having a pin connection at one end to the overlapping portions of a pair of brackets 32, each of which is carried by a corresponding section of a split frame structure 28. A latch bolt 36 is slidably urged by a spring 35 to a position in which the end of the bolt is received in a lower recess 37 in link 31, thereby to retain link 31 in an upwardly extended position. This maintains the frame structure 28 in the upwardly pivoted position illustrated in FIGS. 3 and 6.

Figure 7:
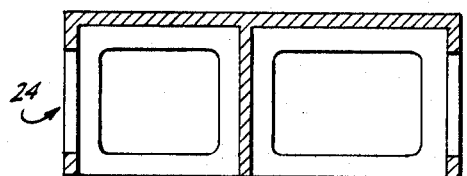
FIG. 7 is a sectional showing of a portion of said latch apparatus, as seen looking in the direction of arrows 7—7 applied to FIG. 5.
Figure 7:
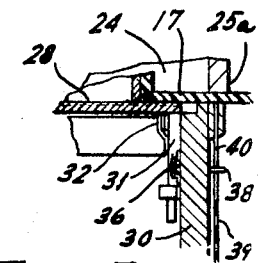
Figure 5:
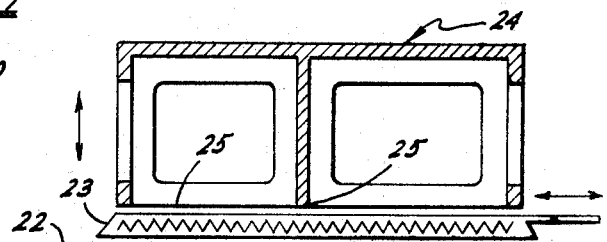
FIG. 5 is another view of the apparatus illustrated in FIGS. 3 and 4, and showing still further operational features thereof.
Figure 5:
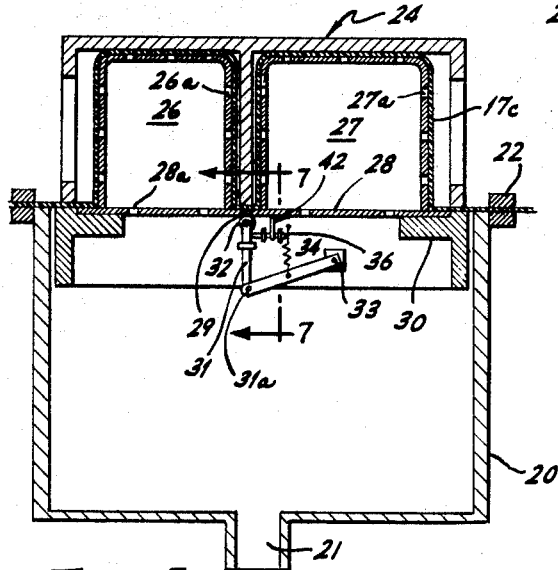

As also shown in FIG. 6, a pin 38 on bolt 36 extends through a slotted portion (not shown) of support frame 30, and is slidably engageable by cam 39 on a vertically slidable bar 40, to provide for movements of spring-loaded bolt 36 into and out of lower recess 37. Bar 40 may be mounted by any suitable means to provide for its sliding movements and, in achievement of its latch release function, the upper end of the bar is engageable by a suitably disposed edge portion 25a of assist plug 24, through the intermediate plastic sheet 17 as illustrated in FIG. 7. Release of latch bolt 36 from lower recess 37 is accompanied by downward, gravitationally assisted pivoting movement of frame structure 28 to its full horizontal position as seen in FIGS. 5 and 7. Upon such pivotation of frame structure 28, link 31 is moved vertically downwardly to a position in which upper recess 41 therein (seen only in FIG. 6) receives bolt 36 under the urging of spring 35. Link 31 is spring loaded to damp or retard the rate of closing movement of the molds 26, 27 as they are urged to the position seen in FIGS. 5 and 7. Spring loading conveniently is afforded through a linkage comprising a pin connection 31a with a lever arm pivotally mounted at 33 to frame 30, and urged upwardly by a suitably tensioned spring 34 between the arm and frame 30.

Additional means for operating latch bolt 36 includes a lever 42, pivoted intermediate its ends at 43. One end of the lever is pin-connected to bolt 34 and the other end comprises a handle portion 44 providing for manual operation of the lever and the bolt 36 linked thereto.

In fabricating the liners, and with reference to FIG. 3, the plastic sheet 17 is heated to a temperature sufficient to cause it to sag, as seen at 17a, while the molds 26, 27 are held in spread position by upward pivotation of the frame structure 28. It will be more fully understood from what follows that the central portion 17d of sagged sheet 17a is opposite the relatively wide space between the upper confronting edges of molds 26 and 27, and thereby makes available an abundance of thermoplastic sheet material for accommodating the relatively deep draw of the confronting liner wall sections.

Figure 4:
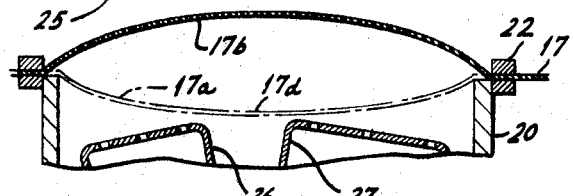
FIG. 4 is a further showing of a portion of the apparatus seen in FIG. 3, and illustrating operational features thereof.

Heater 23 is then removed (see FIG. 4) and slight air pressure applied to the chamber 20, causing the plastic sheet to assume the upwardly ballooned position as seen at 17b, for reasons well understood in this art. Assist-plug 24, the individual sections of which are wide enough to span the pivoted molds, is moved downwardly a sufficient distance to engage the upwardly ballooned sheet 17b and effect ballooned extension thereof (not shown) into each of the assist-plug sections. Frame 30, along with molds 26 and 27, is then moved upwardly, into the telescoping position shown in FIG. 5, with the result that the plastic sheet is drawn over the molds. Having the molds in spread position, during such relative movements, insures full draw and adequate thickness of the spaced adjacent liner sidewalls, making use of the excess material made available in the mid-region 17d upon initial sagging of the heat-softened sheet to the form shown at 17a.

In the operation thus far described, the assist-plug is moved against the pivoted frame structure 28, then in the upper latched position, and exerts force, through the intermediate thermoplastic sheet, to release the latch and accommodate movement of the frame structure downwardly to the full horizontal, lower latched position shown in FIG. 5. Sufficient vacuum is then drawn in chamber 20 to evacuate air from between the molds and the plastic sheet, thereby causing the latter to conform closely to the shape of the molds. Of course it will be understood that pressurized equipment may be used in place of the vacuum apparatus as shown and described.

The formed sheet 17c is then cooled, the assist-plug 24 is withdrawn, and the clamping ring 22 is removed. The formed sheet 17c is then loosened from the molds 26, 27 by applying positive pressure between the sheet and the molds while the latter are held down by the extension of latch bolt 36 into recess 41 in link 31. Formed sheet 17c is then removed and excess peripheral portions are trimmed therefrom, completing formation of the integral compartment liners 13 and 14. The molds are made ready for the next forming operation by releasing latch bolt 36 from recess 41, moving frame structure 28 to its upper latched pivoted position, and repositioning bar 40 to its upper position.

From the foregoing description, it will be appreciated that the invention affords both an improved method and novel mold apparatus useful in forming deep drawn side-by-side tank-like compartment liners.

While in the preferred embodiment, which has been illustrated and described, differential pressure has been applied in such a way as to cause the thermoplastic sheet to conform to the exterior surface of convex molds, it is possible to cause the sheet to conform to the interior surface of concave molds. This possibility is contemplated in the appended claims.

I claim:

1. In apparatus for forming a deep drawn unitary plastic article comprising a pair of adjacent walled structures having unidirectionally presented openings, said apparatus being of the type including a pair of spaced, unidirectionally presented molds having outer surface portions corresponding to the shape of the article to be formed, an assist-plug structure at least a portion of which is insertable into the space between said unidirectionally presented molds, means for supporting a heat-softened unitary sheet of thermoplastic material between said molds and said assist-plug structure, means for effecting relative movement between said molds and said assist-plug structure to cause them to bear against said sheet, and means for producing a pressure differential across opposite surface portions of said sheet to cause it to conform to the surface of said molds, the improvement comprising: means for movably mounting said molds so that in one position thereof confronting mold wall sections are closely spaced, and in another position said wall sections are substantially spaced; means for maintaining said molds in said other, substantially spaced position as said molds and said assist-plug are moved together against said sheet; and means for moving said molds to said one, closely spaced position prior to operation of said means for producing the recited pressure differential.

2. Apparatus according to claim 1, and characterized by the inclusion of articulated base means for supporting said molds in such manner that the recited movements thereof are pivotal.

3. Apparatus according to claim 2, and further characterized in that said means for maintaining said molds in said other position comprises latch means automatically releasable upon the recited movement of said molds and said assist plug together against said sheet.

4. Apparatus according to claim 3, and further characterized in that said latch means further is automatically operable upon movement of said base means to its recited non-pivoted position to retain the latter in such position.

5. Apparatus according to claim 1, and characterized by the inclusion of means for supporting said molds in such manner that the recited movements thereof are pivotal.

6. In apparatus for forming a deep-drawn unitary plastic article comprising a pair of walled tank-like structures having unidirectionally presented openings and adjacent side walls disposed in spaced relation, said walls being joined by flanging extending generally in the plane of the openings of said tank-like structures, said apparatus being of the type including a pair of similarly spaced, unidirectionally presented molds having convex surface portions corresponding to the concave shape of the tank-like structures to be formed, an assist-plug structure at least a portion of which is insertable into the space between the adjacent side walls of said unidirectionally presented molds, means for supporting a heat softened unitary sheet of thermoplastic material between said molds and said assist-plug structure, means for effecting relative movement between said molds and said assist-plug structure to cause them to bear against said sheet, and means for producing a pressure differential across opposite surface portions of said sheet to cause it to conform to the convex surface of said molds, the improvement comprising: means for movably mounting said molds so that in one position thereof confronting wall sections corresponding to said adjacent walls of said tank-like structures are closely spaced, and in another position said wall sections are substantially spaced; means for effecting the recited relative movement between said molds and said assist-plug structure while said wall sections of said molds are in said other substantially spaced position; and means for producing the recited pressure differential while the molds are in said one closely spaced position.

* * * * *